US012406392B2

(12) United States Patent
Zhang et al.

(10) Patent No.: US 12,406,392 B2
(45) Date of Patent: Sep. 2, 2025

(54) VIDEO PROCESSOR CAPABLE OF IN-PIXEL PROCESSING

(71) Applicant: SRI International, Menlo Park, CA (US)

(72) Inventors: David Chao Zhang, Belle Mead, NJ (US); Michael R. Piacentino, Robbinsville, NJ (US); Aswin Nadamuni Raghavan, Pennington, NJ (US)

(73) Assignee: SRI International, Menlo Park, CA (US)

( * ) Notice: Subject to any disclaimer, the term of this patent is extended or adjusted under 35 U.S.C. 154(b) by 402 days.

(21) Appl. No.: 17/992,006

(22) Filed: Nov. 22, 2022

(65) Prior Publication Data

US 2023/0260152 A1    Aug. 17, 2023

Related U.S. Application Data

(60) Provisional application No. 63/292,365, filed on Dec. 21, 2021.

(51) Int. Cl.
*G06V 10/50*  (2022.01)
*G06T 7/73*  (2017.01)
*G06V 10/764*  (2022.01)

(52) U.S. Cl.
CPC .............. *G06T 7/74* (2017.01); *G06V 10/764* (2022.01); *G06T 2207/10016* (2013.01); *G06T 2207/20084* (2013.01)

(58) Field of Classification Search
CPC ............ G06T 7/74; G06T 2207/10016; G06T 2207/20084; G06V 10/764; G06V 10/12; G06V 10/50; G06V 10/62; G06V 10/82; G06N 3/042; G06N 3/048; G06N 3/044; G06N 3/0464; G06N 3/065; G06N 3/045; G06N 3/09
See application file for complete search history.

(56) References Cited

U.S. PATENT DOCUMENTS

| | | | |
|---|---|---|---|
| 11,563,932 B2* | 1/2023 | Haskin | H04N 5/04 |
| 2014/0328570 A1* | 11/2014 | Cheng | G06F 16/43 |
| | | | 386/241 |
| 2018/0314927 A1* | 11/2018 | Muralimanohar | G06N 3/063 |
| 2021/0312274 A1* | 10/2021 | Kale | G06N 3/088 |

OTHER PUBLICATIONS

International Preliminary Report on Patentability mailed Jun. 20, 2024 for Application No. PCT/US2022/051486, 9 pages.

(Continued)

*Primary Examiner* — Stephen R Koziol
*Assistant Examiner* — Dylan J Sherrillo
(74) *Attorney, Agent, or Firm* — Moser Taboada

(57) ABSTRACT

Method and apparatus of processing a sequence of video frames comprising generating at least one video frame and using an analog neural network to select, within the at least one video frame, at least one patch of pixels and process the at least one pixel patch to produce a patch feature for each of the at least one pixel patches. The method digitizes the patch feature, identifies objects within the digitized patch feature, and tracks the objects to generate control information that is used by the analog neural network to select and process the pixel patches.

20 Claims, 6 Drawing Sheets

(56) References Cited

OTHER PUBLICATIONS

Huang, et al., "Glance and Focus Networks for Dynamic Visual Recognition", IEEE Transactions on Pattern Analysis and Machine Intelligence, pp. 1-18.
Hamdi, et al., "flexgrid2vec: Learning Efficient Visual Representations Vectors", pp. 1-13.
Bansal, et al., "PixelNet: Representation of the pixels, by the pixels, and for the pixels", pp. 1-17.
Carrasco, "Visual attention: The past 25 years", Vision Research 51 (2011) 1484-1525.
Dosovitskiy, et al., "An Image is Worth 16×16 Words: Transformers for Image Recognition at Scale", Published as a conference paper at ICLR 2021, pp. 1-22.
He, et al., "Masked Autoencoders Are Scalable Vision Learners", Facebook AI Research (FAIR), pp. 1-14.
Mnih, et al., "Recurrent Models of Visual Attention", pp. 1-12.
Satsangi, et al., "Maximizing Information Gain in Partially Observable Environments via Prediction Rewards", Proc. Of the 19$^{th}$ International Conference on Autonomous Agents and Multiagent Systems (AAMAAS 2020), © 2020 International Foundation for Autonomous Agents and Multiagent Systems (www.ifaamas.org), pp. 1-9.
International Search Report & Written Opinion for Application No. PCT/US2022/051486 dated Apr. 12, 2023, 11 pages.

\* cited by examiner

VIDEO PROCESSOR CAPABLE OF IN-PIXEL PROCESSING

RELATED APPLICATION

This application claims benefit to U.S. Provisional Patent Application Ser. No. 63/292,365, filed 21 Dec. 2021 and entitled "Self-Attention Over Graphs For Anticipatory Detections At The Edge (SAGADE)," which is hereby incorporated herein in its entirety by reference.

This invention was made with Government support under Agreement No. HR00112190119 awarded by the Defense Advanced Research Projects Agency (DARPA). The Government has certain rights in this invention.

FIELD

Embodiments of the present principles generally relate to video processors and, more particularly, to a video processor capable of in-pixel processing.

BACKGROUND

Video processors have found use as sensors at the edge of communications networks (e.g., Internet). Artificial intelligence (AI) neural networks are being employed in conjunction with the video processors to process the huge volumes of video imagery that is collected at the network edge. These video processors may perform multiple object tracking using convolutional neural networks having 10 to 100 or more layers. The computing resources necessary for such processing is typically performed in data centers remotely located from the point where the video data is collected. Such distributed systems are expensive, energy inefficient and experience substantial latency.

Thus, there is a need for a video processor that is capable of operating at the network edge that is cost effective, energy efficient and experiences low latency.

SUMMARY

Embodiments of the present invention generally relate to a video processor capable of in-pixel processing as shown in and/or described in connection with at least one of the figures.

More specifically, embodiments of the invention include a method and apparatus configured to generate a video frame and use an analog neural network to select, within the video frame, at least one patch of pixels and process the at least one pixel patch to produce a patch representation for each of the at least one pixel patches. The patch representation is digitized and analyzed to identify features within the digitized patch representation. The features are tracked and information is generated that is used by the analog neural network to select the pixel patches. In at least one embodiment, the analog neural network performs in-pixel processing of analog pixel signals from a photosensor array. The feature tracking may further include saccade processing to determine the pixel patches to be processed.

These and other features of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
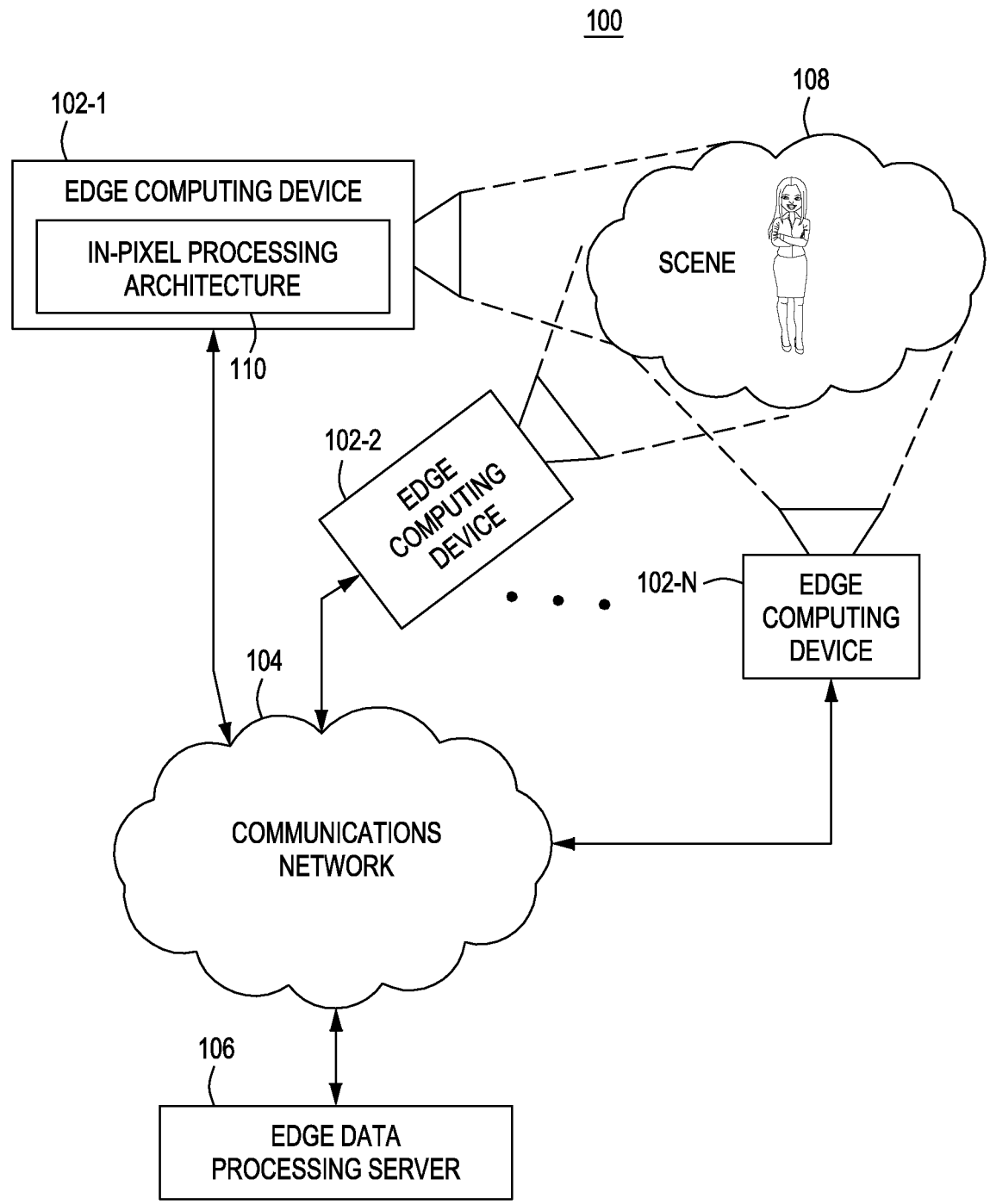
FIG. 1 depicts a system comprising edge computing devices which are structured and operate in accordance with at least one embodiment of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for creating and operating a computing device capable of in-pixel processing of video information. In one exemplary embodiment, the in-pixel processing is performed using an analog neural network located at a photosensor array. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Embodiments of a computing device capable of in-pixel processing described herein enable many capabilities and applications not previously achievable thru any individual computing system. Embodiments of the disclosed architecture address the problem of decreasing size, weight, and power (SWaP) for computing devices as well as enable computing devices to locally perform artificial intelligence (AI) processing. Embodiments of the invention are especially useful in edge devices, i.e., computing devices that operate at the edge of communications networks such as mobile phones, laptop computers, surveillance devices, Internet of Things (IoT) devices, and the like. Using embodiments of the invention enables edge devices to no longer rely upon centralized AI processing for identification and classification of objects contained in video information.

An example system application for embodiments of energy and memory efficient, neural networks is the operation and communication of distributed smart sensors within a smart city. Cities are adding autonomous monitoring capabilities to support safety, health and the smooth flow of traffic and crowds. Cities have begun to add AI-based edge-based sensing and processing throughout the city to monitor vehicle traffic flow, air pollution, water levels, crowd monitoring, etc. Today, edge-based sensing solutions require the cloud to process the large amount of data produced by edge computing solutions. Such high data volumes, require high data bandwidth for transmission of the collected information, long communication delays, large processor devices and high-power consumption.

To support the goals of smart cities to autonomously monitor operations throughout including sensing from mobile platforms such as UAV aerial monitoring, cars, rechargeable portable bicycles or scooters, etc., platform-based sensing and processing must be small and low-power. For the timely autonomous monitoring of dynamically changing activities, events, objects, viewed by multiple sensors in a city it is required to rapidly process video information at the edge. Using in-pixel processing at the edge enables the use of saccade processing and salient feature extraction within the edge computing device such that salient information is processed and all other video content can be ignored. The use of saccade processing and salient feature extraction enables rapid, local processing of video information. The processed data has lower bandwidth and contains only salient information that may be further processed or reviewed at a centralized location.

More specifically, embodiments of a computing device that uses in-pixel processing comprises a photosensor array coupled to an in-pixel analog neural network. The analog output of the analog neural network is digitized and coupled to a near-pixel patch processor that is configured to identify patches of salient information within the video information. The identified patches are subsequently processed by a feature processor and an attention predictor. The attention predictor generates saliency and tracking information that is coupled to a controller configured to control the analog neural network. The feature processor is configured to track salient features over time within the patch features from the patch processor. The extracted salient features may be processed further either locally or sent to a centralized server for further processing, storage, review, or analysis.

Embodiments of the invention use saccade and feature tracking techniques to limit the amount of data from video frames that is required to be processed to identify and classify salient objects within video. Saccade techniques mimic rapid human eye movements in small increments (1-2 degrees) that fix attention onto features within a scene. Taking inspiration from the human visual system, embodiments of the invention utilize intelligent image patch selection as a means to reduce the amount of data that must be processed by the neural networks, enabling the use of deep neural networks for real-time applications. As such, efficient in-pixel and near pixel processing is used to process minimal data as predicted from previous video frames.

FIG. 1 depicts a system 100 comprising edge computing devices which are structured and operate in accordance with at least one embodiment of the invention. In an exemplary embodiment, the system 100 comprises at least one edge computing device 102-1, 102-2, . . . 102-N (where N is an integer), a communications network (e.g., Internet or cloud) 104 and an edge data processing server 106. At least one edge computing device 102 (e.g., device 102-1) comprises an in-pixel processing architecture 110. In use, the at least one edge computing devices 102 gather data representing salient portions of a scene 108, locally process the data and communicate the processed data (typically, data concerning salient features within the scene 108) to the communications network 104. The processed data is routed to the edge data processing server 106 for further processing, analysis, distribution, review, and/or storage. The structure of the computing devices 102 and the server 106 are detailed below with respect to FIG. 6. As shall be described in detail below, the in-pixel processing architecture 110 provides an efficient, cost-effective technique for locally processing video information which results in system-wide bandwidth reduction, lower cost server processing and less system latency.

In one embodiment, the edge computing device 102 may form a dedicated sensor or Internet of Things (IoT) for collecting video imagery of the scene 108. In other embodiments, the edge computing device 102 may be a portion of a smartphone, laptop computer, tablet, gaming device, surveillance system, and the like. Embodiments of the invention may find use in any computing device operating at the edge of a computing/communications network, where the computing device would be improved by a reduction in power consumption and a reduction in data bandwidth.

Figure 2:
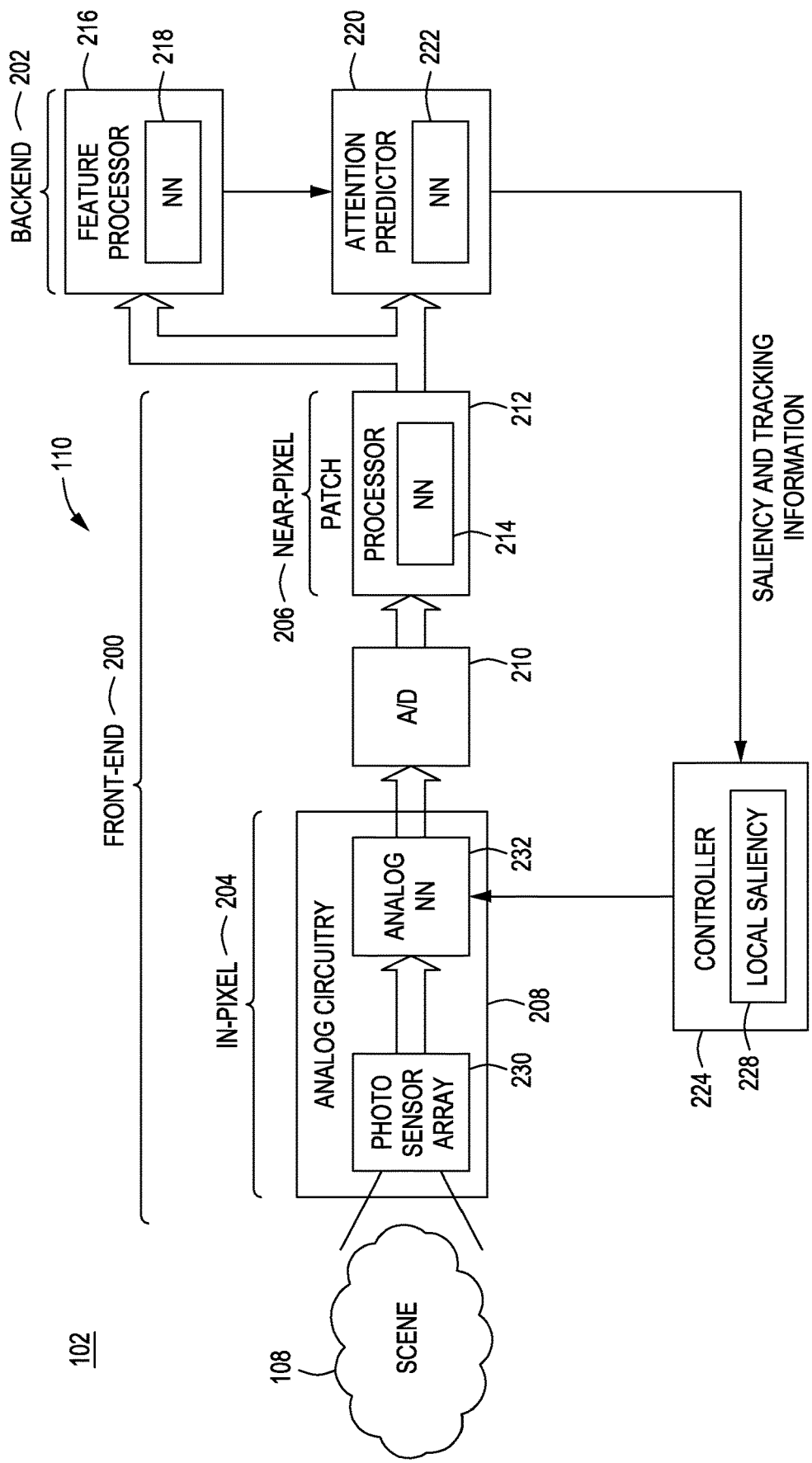
FIG. 2 depicts a functional block diagram of an exemplary edge computing device utilizing an in-pixel neural network architecture of at least one embodiment of the invention.

FIG. 2 depicts a functional block diagram of the exemplary edge computing device 102 of FIG. 1 utilizing an in-pixel neural network architecture 110 of at least one embodiment of the invention. The architecture 110 comprises front end processing 200 for imaging a scene 108 and identifying salient patches of information (referred to herein as patch features) within the scene and back-end processing 202 for processing the patch features to both extract salient objects from the imagery and perform attention processing for controlling salient patch identification for use by the front end 200. The back-end processing 202 defines salient pixel areas that are coupled to the front-end processing 200 such that salient portions of each captured video frame or a sequence of frames are identified for processing (i.e., patch based processing is used). Regions of the imagery not within the salient portions are not processed. In addition, the back-end processing 202 applies attention processing (e.g., Saccade motion processing and object tracking), where a few attentive object features are processed from each video frame or over a sequence of frames. Embodiments of the invention reduce the dimensionality of the processed data by 10× compared to conventional image processing and produces a front-end imager that may consume less than 30 mW per megapixel.

The various embodiments described below utilize front-end processing configured to receive a video frame from a photosensor array containing a first amount of information and use a combination of an analog neural network (in-pixel processing) and a digital neural network (near-pixel processing) to selectively reduce the first amount of information to a second amount of information, where the first amount is greater than the second amount. The back-end processing is configured to attention process at least portion of the second amount of information to define a selection criterion for selecting portions (features contained in pixel patches) of the video frame that forms the second amount of information.

The front-end processing 200 comprises in-pixel processing 204, a digitizer (e.g., analog-to-digital converter (ADC) 210, near-pixel processing 206 and a controller 224. In one embodiment, the in-pixel processing 204 may be performed using analog circuitry 208 comprising a photosensor array 230 and an analog neural network 232. In one embodiment, the analog neural network 232 is a convolutional neural network (CNN), recurrent neural network (RNN) or a transformer. As is known by those skilled in the art, other forms of neural networks may be used such as graph neural networks, capsule neural networks, sequential neural networks, and the like. Details regarding the structure and operation of one exemplary embodiment of the analog circuitry 208 are provided with respect to FIG. 5 below. In short, the photosensor array 230 (e.g., an array of pinned photodiodes) images the scene 108 to produce sequential frames of pixels. The analog neural network 232 is, in one embodiment, a single layer neural network that applies weighting to each pixel value. The analog output of the analog circuitry is digitized in the ADC 210.

The controller 224 utilizes information regarding local saliency 228 of a video frame being captured and processed. The controller 224 controls the analog NN 232 such that pixels in regions (i.e., salient patches) of the video frame that are deemed salient by the back-end processing 202 are weighted and digitized. The patch selection is controlled by the local saliency information 228. The local saliency information 228 is defined by the back-end processing 202 using attention processing techniques (i.e., saliency and feature tracking techniques). In one embodiment, the local saliency information 228 defines one or more non-overlapping patches (e.g., an 8×8 pixel patch). The patches may be adjacent to produce patches of 8, 16, 24 or 32 pixels. Other sized patches may be used. The patches are processed by the analog NN 232 (e.g., pixels are weighted and summed) to produce a vector representation (i.e., patch feature) of a feature or features within the patch.

The ADC 210 converts the analog patch feature into the digital domain for near-pixel processing 206 within a patch processor 212. The patch processor 212 comprises a multi-layer neural network 214 that is trained to identify and classify features (objects) represented by the patch features. The patch processor 212 may be a graphical neural network, a convolutional neural network, sequential neural network, recurrent neural network, transformer, or the like. In one embodiment, the in-pixel and near-pixel neural networks are trained together to identify specific objects within the video frames, e.g., people, vehicles and the like.

The feature processor 216 and the attention predictor 220 use neural networks to spatiotemporally track objects within and across video frames. The feature processor 216 identifies and classifies objects within the video frames using deep neural network processing. Information regarding the location of the features within a frame are coupled to the attention predictor 220 such that the objects are tracked over time from frame to frame. As such, the attention predictor 220 performs anticipatory processing to predict the location of objects from frame to frame. The attention predictor 220 produces control information (saliency and tracking information) that is used by the controller 224 to select the patches in a subsequent video frame. Additionally, in at least one embodiment, the attention predictor 220 may apply saccade motion processing to the feature information. Such processing generates a saccade mask defining a plurality of patch locations and weights $W_{i,v}$ for the pixels in the patch. The patch locations with pixel weights (saccade information) and an estimate of the motion of the patch locations (tracking information) are coupled to the controller 224 such that the controller 224 uses the saccade, saliency and tracking information to control the analog circuitry 208 to process only salient regions of the imaged scene.

The feature and attention predictors 216 and 220 utilize neural networks (e.g., graphical neural network, a convolutional neural network, sequential neural network, recurrent neural network, transformer, or the like) to implement self-attention concepts that selectively attends to pixels based on local correlations (lateral excitation and inhibition). In one embodiment, local saliency may be learned using self-attention on a sparse graph over few image patches selected by the back-end processing. The back-end processing captures spatiotemporal information and can predict the most salient regions for sensing and updating the locations of objects. In one embodiment, the attention predictor 220 analyzes one or more video frames to produce control information that may be used to select salient patches in a subsequent video frame. In some embodiments, the control information may be used by the analog NN 232 over multiple subsequent frames (i.e., controlling the NN 232 over three-dimensions—two dimensions within each video frame and over time for multiple frames). This processing is tightly coupled with self-attention front-end processing to achieve data sparsity and energy delay product (EDP) savings (e.g., a 10× data reduction).

In some embodiments, the attention predictor 220 captures various heuristics including, but not limited to, object motion, object velocity and/or uncertainty of the neural network in selecting patches, amongst other object information, to assist in patch selection and tracking. In one embodiment, patch selection may utilize bounding boxes and the bounding boxes are scored using object detection uncertainty, anticipatory foreground prediction, and/or Kalman covariance score. The scores of each bounding box are summed and the bounding box scores are sorted highest to lowest score. The bounding boxes with the highest scores representing up to a threshold number of patches, e.g., 30% of the patches, are selected as the control information used to select patches in one or more subsequent frames.

In order to account for the relative distance between sensed patches, a sparse graph with nodes as patch feature vectors and edges as relative distance between patches (alternatively, node attributes include patch location) may be formed. Graph pooling can reduce the number of nodes. The front-end outputs a saliency map and associated feature vectors with data bandwidth reduction of approximately 10× from the full image frame. In order to achieve >20× reduction in EDP, only salient feature vectors are coupled to the back-end.

In one embodiment, the NNs 218 and 222 comprise deep anticipatory networks (DAN) that function as a Q-network (an anticipatory RNN 218) that selects saccade patches and an M-network (tracking NN 218) that predicts the task output of tracking. The tracking NN takes its input as the features of the saliency patches and regresses bounding boxes and instance identification or other equivalent outputs for tracking, e.g., using panoptic segmentation datasets. The anticipatory NN takes inputs from the patch processor and the tracking NN, and outputs a number of patches (e.g., a fixed number of patches). The Q and M networks are trained simultaneously using, for example, the DAVSOD dataset: the Q network learns a Q-function that estimates how much each saccade would help the M network track objects in the next frame. Given good truth data, the M network learns in a supervised manner, given the observations generated by saccades that were selected according to the Q-network. The Q-network is trained to predict a sequence of human attention at future time steps based on partially sensed inputs at earlier time steps.

In one embodiment, a 30 Hz, 1 MPixel imager with 25% 3×3 tiles active contributing to an average of 200 patches generates about 100K feature vectors from the in-pixel processing. Such analog processing is estimated to consume under 35 mW. The vectors are read out to a 200 node layer near-pixel neural network resulting in a digital output of 100K features per frame. The 100K features represent a 10× data reduction compared to a 1 Mpixel Bayer imager.

Figure 3:
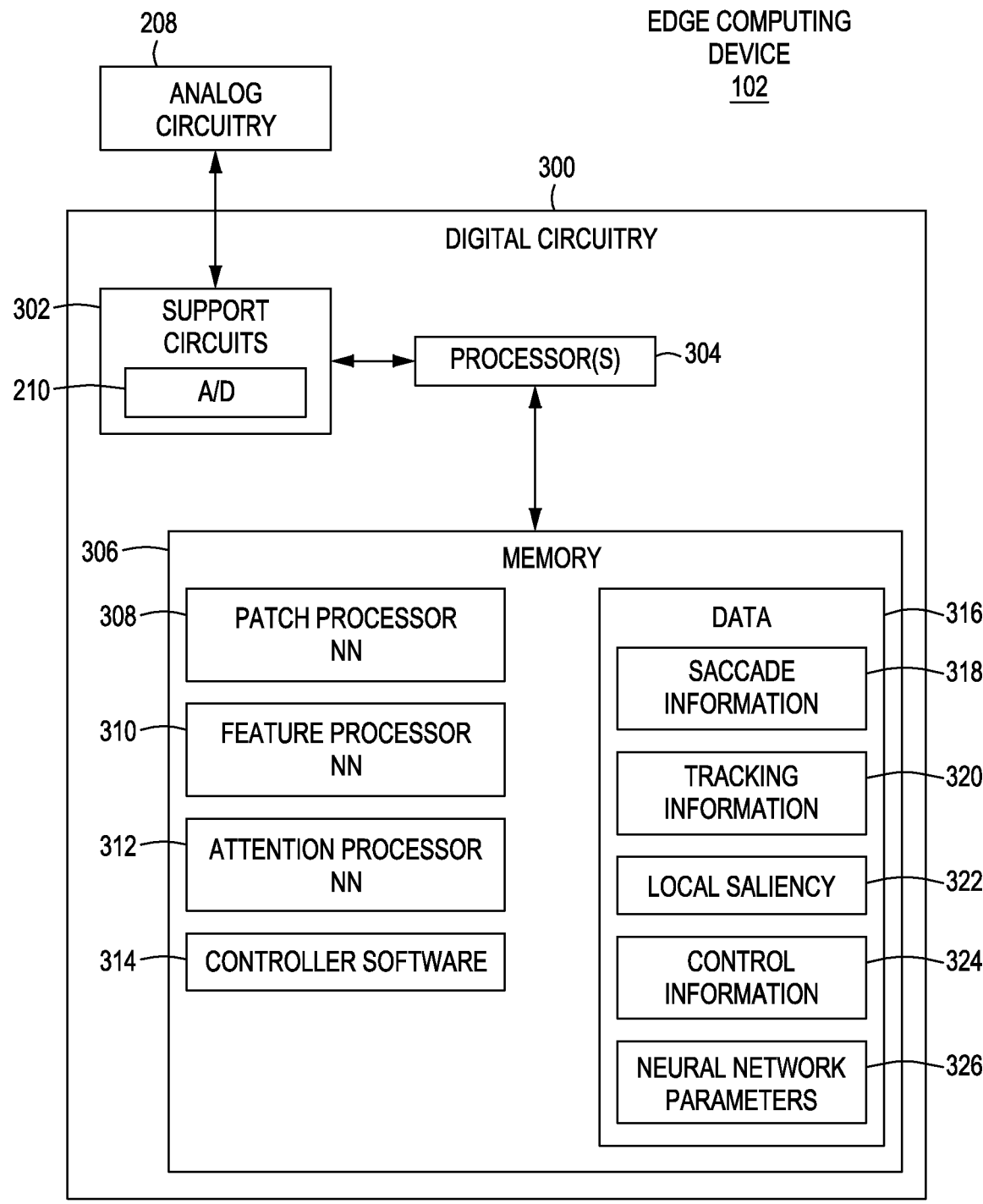
FIG. 3 depicts a block diagram of an exemplary implementation of an edge computing device utilizing an in-pixel neural network architecture of at least one embodiment of the invention.

FIG. 3 depicts a block diagram of an exemplary implementation of the edge computing device 102 utilizing an in-pixel neural network architecture of at least one embodiment of the invention. The device 102 comprises the in-pixel analog circuitry 208 of FIG. 2 (and described in detail with respect to FIG. 5) coupled to digital circuitry 300, where the digital circuitry 300 implements the digitization, near-pixel and back-end processing (elements 210, 212 and 202 of FIG. 2). The digital circuitry 300 comprises at least one processor 304, support circuits 302 and memory 306. The at least one processor 304 may be any form of processor or combination of processors including, but not limited to, central processing units, microprocessors, microcontrollers, field programmable gate arrays, graphics processing units, and the like capable of executing software instructions to cause the controller to perform the functions described herein. The support circuits 302 may comprise well-known circuits and devices facilitating functionality of the processor(s). The support circuits 216 may comprise one or more of, or a combination of, power supplies, clock circuits, communications circuits, cache, displays, and/or the like. The support circuits 216 include the ADC 210 as described with reference to FIG. 2.

The memory 306 comprises one or more forms of non-transitory computer readable media including one or more of, or any combination of, read-only memory or random-access memory. The memory 306 stores software and data including, for example, neural network software and libraries (i.e., 308, 310, 312), controller software 314 and data 316. The data comprises, but is not limited to, saccade information 318, tracking information 320, local saliency 322, control information 324 and neural network parameters 326.

Functionally, the at least one processor 304 executes the software (e.g., routines, and libraries) to implement the patch processor neural network 308, feature processor neural network 310, and attention predictor neural network 312. Each of these neural networks uses the neural network parameters (e.g., weights and biases) to operate as described above with respect to FIG. 2. The controller software 314 is executed by the at least one processor 304 to implement the controller 224 of FIG. 2. The controller 224 utilizes the saccade information 318, tracking information 320, local saliency 322 and control information 324 to control the analog circuitry 208 and facilitate the operation of the analog neural network 232. When the at least one processor 306 executes the instructions contained in the software 308, 310, 312, 314, the edge computing device 102 is caused to perform operations that are represented by the method depicted in FIG. 4.

Figure 4:
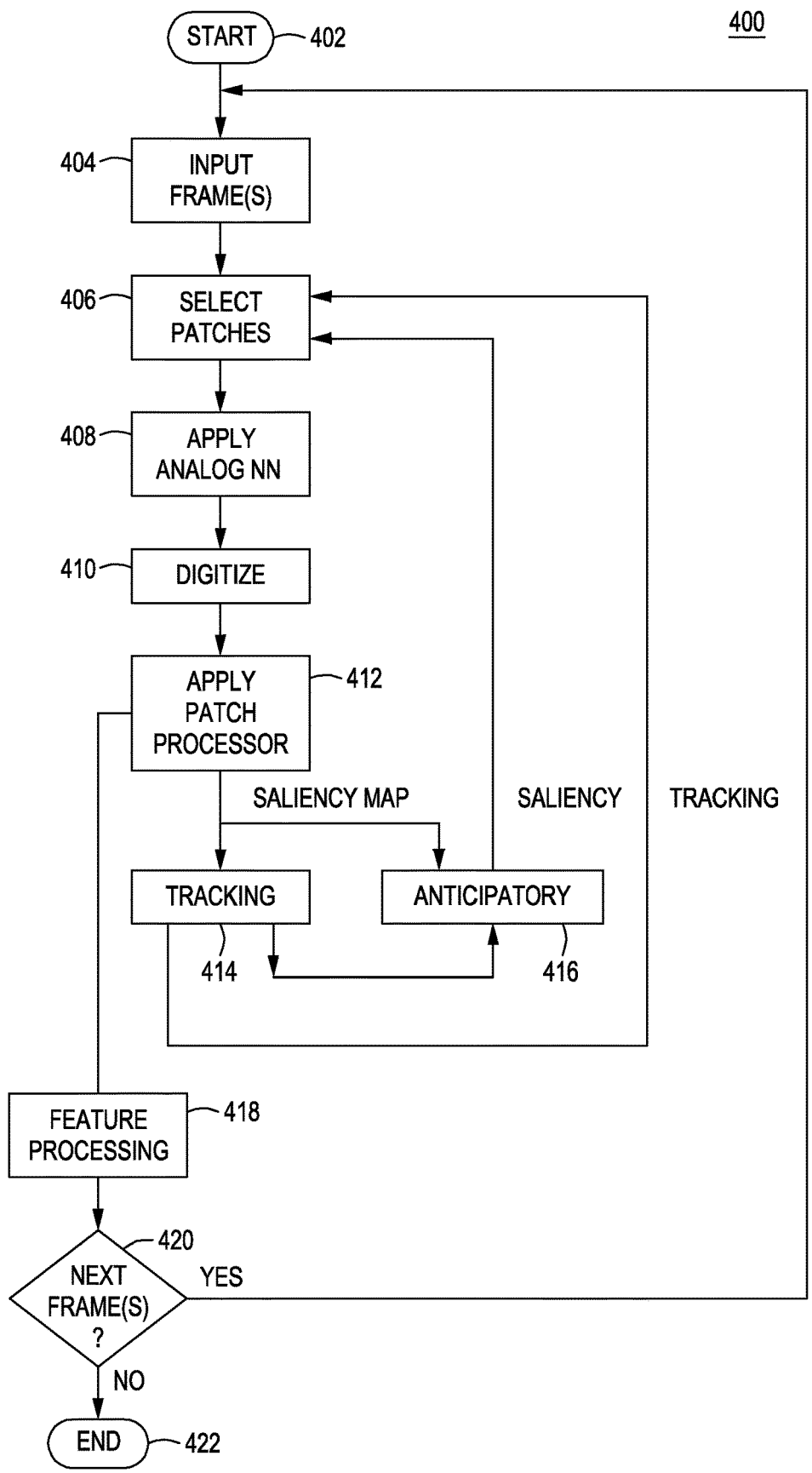
FIG. 4 depicts a flow diagram of a method of operation of the in-pixel neural network architecture in accordance with at least one embodiment of the invention.

FIG. 4 depicts a flow diagram of a method 400 of operation of the in-pixel neural network architecture in accordance with at least one embodiment of the invention. The method 400 begins at 402 and proceeds to 404, where at least one video frame is input to the architecture, i.e., captured by the photosensor array and held by a correlated double sampling (CDS) circuit. At 406, the method 400 selects patches within the frame that are to be processed. These patches are defined by the saccade and tracking information respectively supplied by the attention predictor NN and the feature processor NN. At start up, the patches may not be well defined and/or may cover the entire frame. However, after a few frames are processed the neural networks quickly identify salient features, begin tracking those features and defining patches to extract the salient features while ignoring non-salient content of the frame.

At 408, the pixels within the patches are processed by the analog NN. Using an analog NN facilitates low power processing of the pixels at an in-pixel level. Operating of the analog NN is described in detail below with respect to FIG. 5. The output of the analog NN is a vector representation of a salient feature or features in each of the pixel patches. At 410, the vectors are digitized by the ADC. All subsequent processing after 410 is performed in the digital domain.

At 412, the method 400 applies the patch processor NN to the digitized vectors to refine the feature identification processing such that only salient features are tracked. At 414, the salient features are tracked across time, i.e., across multiple sequential video frames. This tracking is performed by the feature processor NN. At 416, anticipatory processing is performed using the salient features and the tracking information. The anticipatory processing produces the saccade information to mimic human vision such that the location of a patch in a subsequent frame is anticipated. The saccade information and the tracking information are coupled to 406 to define where the patches are located for analog processing of the next frame. In some embodiments, multiple frames may be processed to generate the saliency and tracking information (control information) to add a temporal component to the patch selection process.

At 418, the method processes the salient features to output these features for further processing, storage, or analysis. At 420, the method queries whether a next frame should be processed. If the query is affirmatively answered, the method proceeds to 404 to capture another video frame. If the query is negatively answered, the method 400 proceeds to end at 422.

Figure 5:
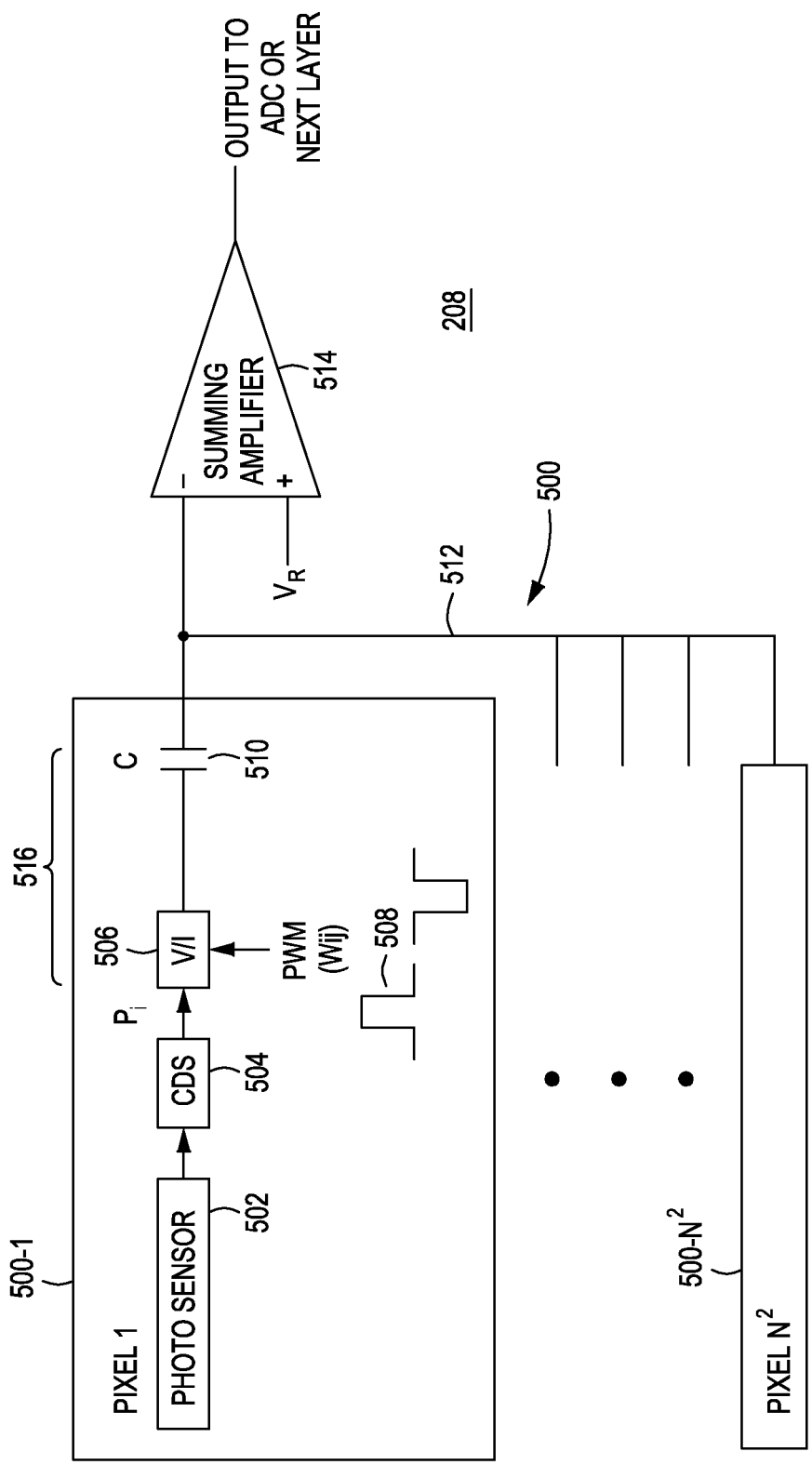
FIG. 5 depicts a block diagram of an analog neural network in accordance with at least one embodiment of the present invention.

FIG. 5 depicts a block diagram of a circuit implementation of the analog circuitry 208 in accordance with at least one embodiment of the present invention. In one exemplary embodiment, the in-pixel front-end is based upon CMOS continuous interleaved sampling (CIS) processes utilizing a pinned photo diode detector 502 with in-pixel capacitor storage of clamp and sample signals to implement multiplication and division functions at nodes of the analog NN. Using a switched capacitor technique to implement analog circuit elements 516 used in the NN, which allows for fabrication using deep sub-micron processes that results in an implementation which minimizes power consumption. In other embodiments, the analog circuit elements may be at least one transistor, memristor or other analog circuit element that may be used for preforming multiplication and division functions.

In an exemplary embodiment, the analog circuitry 208 comprises a plurality of pixel processing elements 500-1 ... 500-$N^2$ coupled in parallel to a summing amplifier 514. There are $N^2$ pixels (e.g., 8×8) within a given salient patch. Each pixel is sampled by a pinned photosensor diode 502 and the sample is coupled to a correlated double sampling (CDS) circuit 504 to reduce noise. The voltage output of the CDS 504 is coupled to a voltage to current converter 506. The converter 506 may have a conversion curve to implement sigmoid or ReLU functions. The current from converter 506 is applied to a capacitor 510. The converter 506 is controlled by a pulse width modulated (PWM) signal 508 which forms an analog weight ($W_{i,j}$) for the neural network. The output current is a pulse 508 having a length that is controlled by the PWM such that the stored value in the capacitor represents a multiplication of the pixel value $P_i$ and the weight $W_{i,j}$. The value stored on the capacitor 510 may be positive or negative.

The capacitors 510 of all $N^2$ pixels in the patch are coupled to an input of a summing amplifier 514. The amplifier 514 generates an output that is a sum of the stored, weighted pixel values from the capacitors 510. This output may be coupled to the ADC or may be coupled to another layer of analog neural network processing (e.g., a layer of V/I converters, capacitors and summers). As such, the analog neural network may comprise a single layer or multiple layers.

In various embodiments, multiplication and division operations are implemented through modulation of capacitor charging currents. A photon signal P can be multiplied with or divided by a weight w programmed by pulse width modulation (PMW) to modulate the capacitor charging current. The application of weights to the pixel correlated double sampling (CDS) output voltage is achieved by charging a capacitor to the CDS voltage output. Then additional capacitor voltages are combined with the first capacitor voltage to divide down the voltage and produce a weighted voltage output. Various switching circuits (not shown) may be used to couple the capacitors to one another. For example, the addition of the weighted outputs of two pixels is realized by switches that connect the weighted voltages in series. The subtraction operation is enabled by reversing the capacitor polarity before connecting the capacitors in series or applying an inverse modulated charging current. In one embodiment, a two transistor method is used to implement the V/I converter 506 that converts pixel voltage into a current for charging a capacitor. The voltage controlled current source modulates the drain to source voltage of a FET biased in the linear range—either as a ReLU or a Sigmoid function depending upon the bias voltage.

When a pixel is located in a deselected patch, the photodiode needs to be cleared so the next read is not contaminated by the previously collected remnant charge. This operation requires very low power. For a BSI (Back-side-illuminated) imager, this may be implemented using a lateral charge dump and control gate. Any unused transistors are powered down. The front-end source follower consumes no power unless the clamp voltage capacitor is clocked.

All pixels are exposed at the same time and sampled and held in the CDS circuit 504. The pixel voltages are coupled to the CNN which produces a linear projection in the analog domain M times for an M-size analog 1-D vector patch. The exposure time is in parallel with the processing providing global shutter implementation with a programmable exposure time.

The sampled values of each frame form the inputs to the analog vector multiplication using pulse-width modulation and programmable weights currents for each of the pixels with the result stored in a small capacitor for each pixel. The other side of the capacitors are connected to a single amplifier per patch to hold the summed value. The charge distributed between all the capacitors computing the sum divided by the number of pixels in the patch. By using the amplifier, the summed charge is held constant. The analog vector computation is performed M times to generate an M-size analog 1-D vector patch.

For every vector after a reset, for each pixel, a capacitor (e.g., a 30 fF capacitor) is charged with a current representation of the pixel intensity converted to a pulse width, charging the pixel capacitor with weight voltage controlled current, generating a charge that is the multiplication of the pixel and the programmed weight. For negative weights, a negative current is used. Then, a switch (not shown) is used to connect all the capacitors in the patch to the negative input of the amplifier, with the positive input connected to a voltage reference $V_R$. The analog output for vector v with weights $W_{i,v}$ and pixels $P_i$ for i=1, 2, ... $N^2$ then represents:

$$Out_v 32\ V_R + \Sigma_{N^2}(W_{i,v} \cdot P_i)/N^2$$

For the baseline design, the patch outputs are read-out to the ADC at the edge. The $Out_v$ is the readout to an ADC with $V_R$–b subtracted in the digital domain to compute:

$$Dig\_Out_v = b + \Sigma_{N^2}(W_{i,v} \cdot P_i)/N^2$$

Only the outputs of a selected set of salient patches (e.g., <25% of all pixels) are converted to the digital domain and processed in the near-pixel CNN, thus saving power, output dimensions and bandwidth.

In one embodiment, the analog circuit is limited to non-overlapping N×N size patches with one amplifier per N×N patch per vector. One exemplary embodiment uses an 8×8 pixel patch that can be offset by 4 pixels in either direction per vector. Multiple patches can be connected for any of the vector computations for patch sizes of 8, 16, 24, or 32 pixels in horizontal or vertical directions (e.g., 8×32, 24×16, etc.). Other patch sizes are possible. The pixels may be monochrome or have a color pattern such as Bayer.

Figure 6:
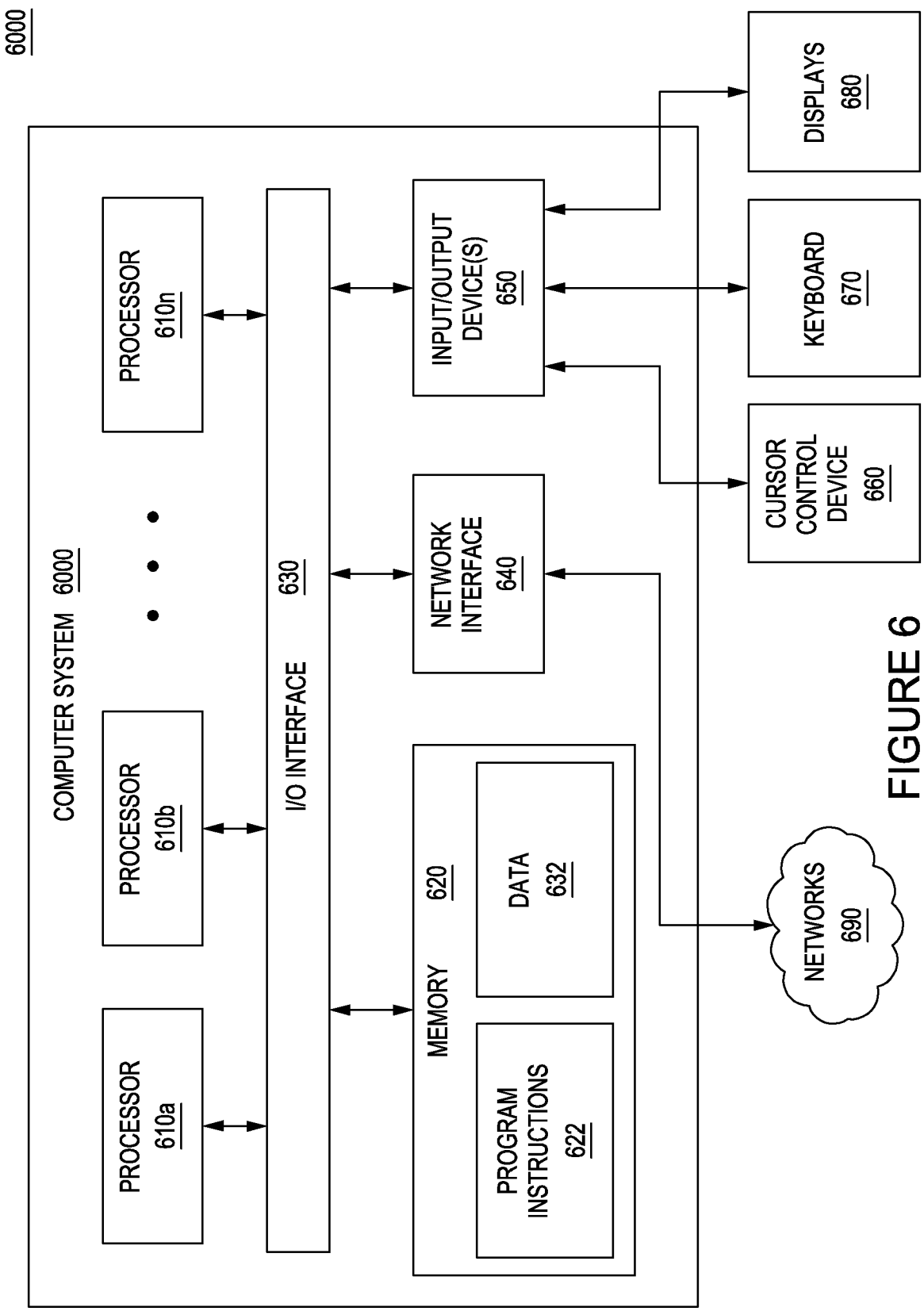
FIG. 6 depicts a computer system that can be utilized in various embodiments of the present invention to implement the computing device according to one or more embodiments.

FIG. 6 depicts a computer system 600 that can be utilized in various embodiments of the present invention to implement the computing device 102 or server 106, according to one or more embodiments.

Various embodiments of an in-pixel analog neural network architecture, as described herein, may be executed on one or more computer systems, which may interact with various other devices. One such computer system is computer system 600 illustrated by FIG. 6, which may in various embodiments implement any of the elements or functionality illustrated in FIGS. 1 through 5. In various embodiments, computer system 600 may be configured to implement methods and functions described above. The computer system 600 may be used to implement any other system, device, element, functionality or method of the above-described embodiments. In the illustrated embodiments, computer system 600 may be configured to implement the edge device 102 and implement the in-pixel analog neural network architecture as processor-executable executable program instructions 1022 (e.g., program instructions executable by processor(s) 610) in various embodiments.

In the illustrated embodiment, computer system 600 includes one or more processors 610*a*-610*n* coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In various embodiments, any of the components may be utilized by the system to receive user input described above. In various embodiments, a user interface may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, a personal computer system, desktop computer, laptop, notebook, tablet or netbook computer, mainframe computer system, handheld computer, workstation, network computer, IoT sensor device, a camera, a set top box, a mobile device, a consumer device, application server, storage device, a peripheral device such as a switch, modem, router, or in general any type of computing or electronic device.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs). In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any non-transitory computer readable media including any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 690), such as one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the operations and methods described above, such as the functions illustrated by the diagram of FIGS. 2-4. The functional blocks of FIGS. 2-4 may be implemented in the user device or may be implemented partially in the user device and partially in the server 106. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. An apparatus configured to process a sequence of video frames comprising:
   a photosensor array;
   an analog neural network configured to receive a sequence of video frames from the photosensor array, select at least one pixel patch within at least one video frame, and process the at least one pixel patch to produce a patch feature for each of the at least one pixel patches;
   a digitizer configured to digitize the patch feature;
   a digital neural network configured to identify at least one object within the digitized patch feature; and
   an attention predictor configured to track the at least one object and generate control information that is used by the analog neural network to select and process the at least one pixel patch.

2. The apparatus of claim 1, wherein the analog neural network is configured to provide in-pixel processing.

3. The apparatus of claim 2, wherein the analog neural network comprises at least one layer, where each at least one layer comprises:
   a plurality of analog circuit elements, where each analog circuit element is couple to a photosensor in the photosensor array;
   a controller configured to control operation of the plurality of analog circuit elements to implement multiplication and division functions; and
   a summer configured to sum outputs from the plurality of analog circuit elements and create a weighted sum of pixel values as the patch feature.

4. The apparatus of claim 3, wherein the plurality of analog circuit elements comprise at least one of a capacitor, a transistor, or a memristor.

5. The apparatus of claim 1, further comprising a feature processor configured to process the identified patch features to identify and/or classify objects within the sequence of video frames.

6. The apparatus of claim 1, wherein the attention predictor is configured to provide salient regions of at least one video frame to be used to select the at least one pixel patch.

7. The apparatus of claim 1, wherein the attention predictor is configured to track objects over time and utilizes temporal tracking information to generate the control information.

8. The apparatus of claim 1, wherein the attention predictor uses a selection criterion for selecting the at least one pixel patch comprising at least one of object motion in a pixel patch, object velocity in a pixel patch or uncertainty in selecting a pixel patch.

9. A method of processing a sequence of video frames comprising:
   generating at least one video frame;
   using an analog neural network to select, within the at least one video frame, at least one patch of pixels and process the at least one pixel patch to produce a patch feature for each of the at least one pixel patches;

digitizing the patch feature;
identifying at least one object within the digitized patch feature; and
tracking the at least one object and generating control information that is used by the analog neural network to select and process the at least one pixel patch.

10. The method of claim 9 wherein the analog neural network is configured to provide in-pixel processing.

11. The method of claim 10 wherein the analog neural network comprises a plurality of analog circuit elements, where each analog circuit element is couple to a photosensor in a photosensor array that generates the at least one video frame, where the method further comprises:
controlling the operation of the plurality of analog circuit elements to implement multiplication and division functions; and
summing outputs of the plurality of analog circuit elements to create a weighted sum of the pixels in the at least one pixel patch as the patch feature.

12. The method of claim 11, wherein the plurality of analog circuit elements comprise at least one of a capacitor, a transistor, or a memristor.

13. The method of claim 9 further comprising processing the identified patch feature to identify and/or classify objects within the sequence of video frames.

14. The method of claim 9, wherein tracking further comprises identifying salient regions of the at least one video frame to be used to select the at least one pixel patch.

15. The method of claim 9, wherein tracking further comprises tracking objects over time and utilizing temporal tracking information to generate the control information.

16. The method of claim 9, wherein the control information is based upon a selection criterion for selecting the at least one pixel patch comprising at least one of object motion in a pixel patch, object velocity in a pixel patch or uncertainty in selecting a pixel patch.

17. Apparatus configured to process a sequence of video frames comprising:
a front end configured to receive at least one video frame containing a first amount of information and use an analog neural network and a digital neural network to selectively reduce the first amount of information to a second amount of information, where the first amount is greater than the second amount; and
a back end configured to attention process at least a portion of the second amount of information to define a selection criterion for selecting at least one salient portion of the at least one video frame that forms the second amount of information.

18. The apparatus of claim 17, wherein the selection criterion further comprises at least one of object motion in a salient portion, object velocity in a salient portion or uncertainty in selecting a salient portion.

19. The apparatus of claim 17, wherein the analog neural network comprises at least one layer, where each at least one layer comprises:
a plurality of analog circuit elements, where each analog circuit element is couple to a photosensor in the photosensor array;
a controller configured to control operation of the plurality of analog circuit elements to implement multiplication and division functions; and
a summer configured to sum outputs from the plurality of analog circuit elements and create a weighted sum of pixel values as the patch feature.

20. The apparatus of claim 17, wherein the plurality of analog circuit elements comprise at least one of a capacitor, a transistor, or a memristor.

* * * * *